United States Patent [19]
Ryuh

[11] Patent Number: 5,390,585
[45] Date of Patent: Feb. 21, 1995

[54] ROTARY MOTION/CONSTANT VELOCITY LINEAR RECIPROCATING MOTION CONVERSION DEVICE AND HYDRAULIC SYSTEM USING THE SAME

[75] Inventor: Young-sun Ryuh, Ulsangoon, Rep. of Korea

[73] Assignee: Samjoo Machinery Co., Ltd., Ulsangoon, Rep. of Korea

[21] Appl. No.: 180,861

[22] Filed: Jan. 13, 1994

[51] Int. Cl.⁶ .................................................. F01B 3/00
[52] U.S. Cl. ....................................... 92/32; 92/31; 92/68; 92/136; 417/534; 74/58
[58] Field of Search .................. 92/31, 32, 33, 68, 71, 92/136; 417/534, 415; 74/58, 59

[56] References Cited

U.S. PATENT DOCUMENTS

| 465,099 | 12/1891 | Rice, Jr. | 74/58 |
|---|---|---|---|
| 900,101 | 10/1908 | Keller | 74/58 |
| 1,024,379 | 4/1912 | Camino | 92/31 |
| 2,738,732 | 3/1956 | Wales | 92/33 |
| 4,730,503 | 3/1988 | Rosenthal | 74/58 |

FOREIGN PATENT DOCUMENTS

| 635902 | 3/1928 | France | 92/31 |
|---|---|---|---|
| 0090405 | 6/1982 | Japan | 92/31 |

*Primary Examiner*—Thomas E. Denion
*Attorney, Agent, or Firm*—Christie, Parker & Hale

[57] ABSTRACT

A rotary motion/constant velocity linear reciprocating motion conversion device capable of converting rotary motion into a constant velocity linear motion or vice versa, and a hydraulic system which can minimize a ripple by using the above-mentioned conversion device, comprises a rotary motion part having a pair of first power transmission elements rotating at the same speed mounted to a common shaft, each element having alternatively positioned teeth capable of transmitting power. A linear motion conversion part comprises a second pair of power transmission elements each positioned adjacent to and engaging the teeth of the first elements. The second elements are each slidably mounted to a helical spline and comprise projections that engage helix grooves arranged in opposite directions along the shaft. The interaction of first and second power elements causes the linear motion of the helix shaft. The helical spline comprises a piston at each end that reciprocates within a respective cylinder. The first and second power elements and the helical spline is configured so that the pistons and cylinders effect the pumping of fluid in a manner minimizing hydraulic pressure pulsations.

4 Claims, 5 Drawing Sheets

ROTARY MOTION/CONSTANT VELOCITY LINEAR RECIPROCATING MOTION CONVERSION DEVICE AND HYDRAULIC SYSTEM USING THE SAME

FIELD OF THE INVENTION

The present invention relates to a rotary motion/constant velocity linear reciprocating motion conversion device and a hydraulic system using the same. More particularly, it relates to a rotary motion/a constant velocity linear reciprocating motion conversion device capable of converting a rotary motion into a constant velocity linear motion or vice versa, and a hydraulic system capable of minimizing any ripple caused by using the above-mentioned motion conversion device.

BACKGROUND OF THE INVENTION

Various mechanisms are used in a hydraulic device, and a swash pump using a swash plate is a typical device. The swash pump is analogous to a slider-crank mechanism and mechanically constructed to convert a linear motion into a rotary motion or vice versa.

The slider-crank mechanism may be used in various constructions and classified, but basically the slider-crank mechanism is a device that converts the rotary motion of a crank into the linear motion of a slider.

When the rotary motion of the crank is converted into the linear motion of the slider, a motion displacement/a speed/an acceleration of a linear motion part accompany a sinusoid motion according to rotation amount $\theta$ of the crank. And when such slider-crank mechanism is used to operate a hydraulic system as a pump and the like, the ripple in output flow and pressure is known to result.

The hydraulic system connected to such a motion conversion device may comprise a pump for generating power, or an actuator actually working like a cylinder or a motor, a control valve for controlling the actuator, or an accessary mechanism playing a supplementary role and the like. Positive displacement pumps such as vane, gear and plunger type pumps are generally selected as the desired hydraulic system because of their ability to generate a high discharge pressure. A screw pump may be used in case of a large capacity or high viscosity.

However, a hydraulic head pressure generated by a hydraulic pump or a hydraulic motor and the like is also known to cause a ripple in the fluid being transported due to the construction or operational characteristics of the pump itself. For example, the hydraulic head pressure of a positive displacement piston operated pump is known to vary widely corresponding to the stroke of the pump piston displacing the fluid, causing ripple in the discharge fluid stream and irregular operation of the actuator in an automation system.

To overcome the above mentioned problem, the hydraulic system may comprises an accumulator or the like to compensate for the pulsations in the hydraulic head caused by known motion conversion devices. However, the use of such additional devices are not the ideal solution because they add to the complexity of the structure, making the control mechanism and routine maintenance unnecessarily complicated and burdensome.

It is, therefore, desirable to construct a rotary motion/constant velocity linear reciprocating motion conversion device which can convert rotary motion into constant velocity linear motion or vice versa, and a hydraulic system which can minimize a ripple associated with using the above-mentioned conversion device.

SUMMARY OF THE INVENTION

There is therefore provided in the practice of this invention a rotary motion/constant velocity linear reciprocating motion conversion device which is capable of converting rotary motion into constant velocity linear motion or vice versa, and a hydraulic system which is capable of minimising any ripple created by using the above-mentioned conversion device. The conversion device comprises a rotary motion part having a first pair of power transmission elements rotating at the same speed on a drive shaft, each first power transmission element having alternatively positioned teeth or friction faces/members positioned about a circumferential surface of each element capable of transmitting power.

The first pair of power elements are arranged on the drive shaft such that the portion of one element comprising teeth or friction faces is paired with a portion of the other element that does not comprise teeth or friction faces. In this manner, each first power element engages an adjacent second power element sequentially, causing the sequential rotation of the second power elements.

A second pair of power transmission elements are slidably mounted onto a helical spline and are alternatively rotated by engagement with teeth or friction faces of the first pair of power transmission elements. The helical spline comprises helix grooves configured in opposite directions along a surface portion of the helix. Each second power element comprises projections that engage a helix groove.

A drive means rotates the drive shaft which rotates the first pair of power elements. As the portion of each first power element comprising teeth engages a second pair of power elements and causes each second power element to rotate sequentially, each second power element rotates along the helical spline via engagement between the projection and the helix groove. Linear movement of the second pair of power elements along the helical spline is restricted by stoppers. Rotational movement of the helical spline is restricted by guide plates attached along the axis of the helical spline that slide linearly within guiders. Accordingly, the sequential rotation of each second power element causes the helical spline to move alternatively in a linear fashion in the forward direction and in the rearward direction, thus converting the rotational motion of the drive shaft to linear motion of the helix shaft.

A piston is attached to each end of the helical spline to reciprocate along with the shaft within a cylinder. A fluid is routed to each cylinder from a reservoir and is pressurized to a desired hydraulic pressure head by the pumping action of the piston within the cylinder. The pressurized fluid existing the cylinders displays minimum ripple effects due to the alternate arrangement of the teeth on the first pair of power elements and interaction of the second pairs of power elements with the oppositely configured helix grooves in the helix shaft, creating a constant velocity reciprocating motion.

BRIEF DESCRIPTION OF THE DRAWINGS

These and other features and advantages of the present invention will become appreciated as the same becomes better understood with reference to the specification, claims and drawings wherein:

DETAILED DESCRIPTION

Figure 1:
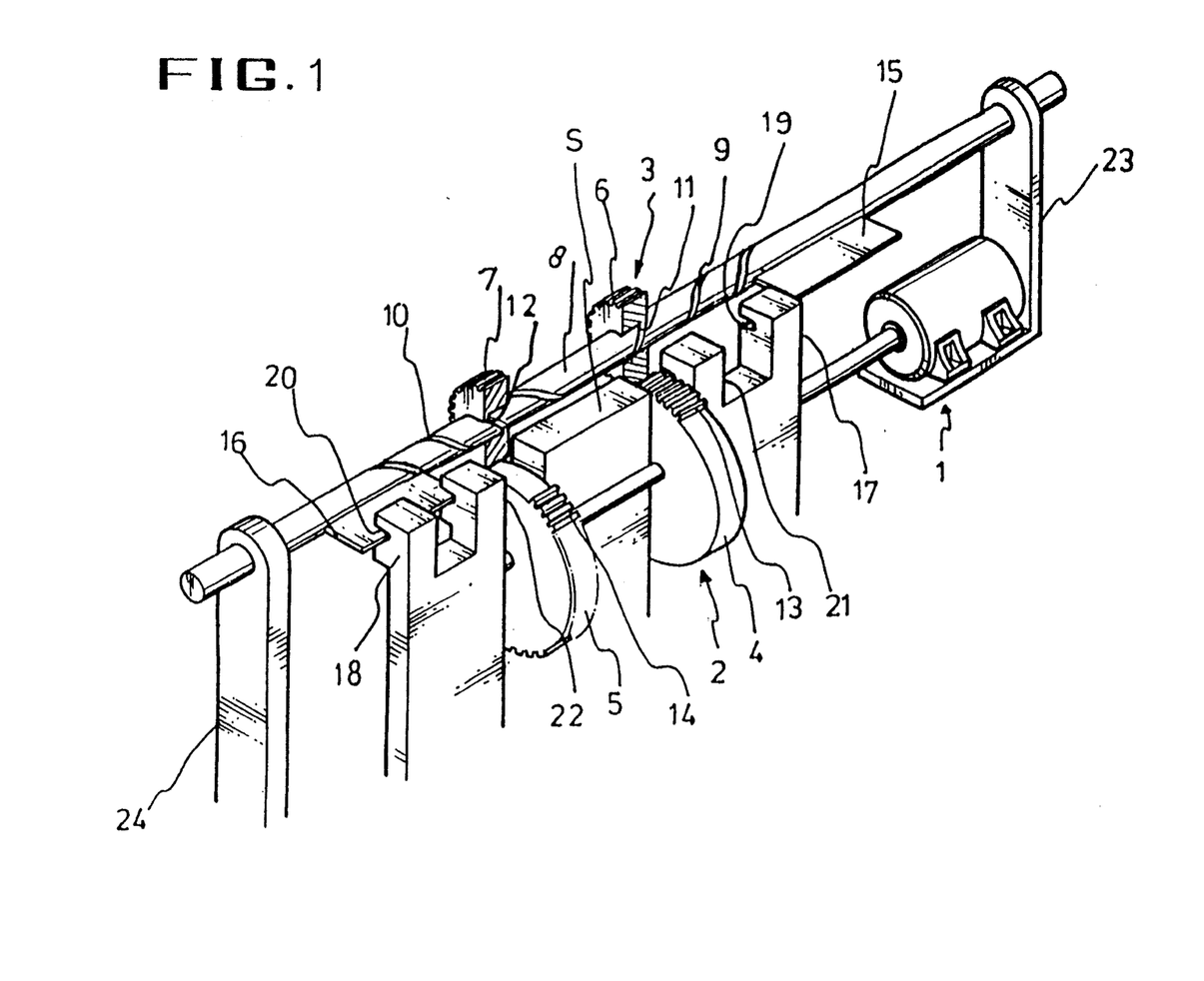
FIG. 1 is a perspective view of a preferred embodiment of a conversion device constructed according to principles of this invention.

FIG. 1 is a perspective view illustrating a preferred embodiment of a motion conversion device constructed according to the principles of this invention, and comprising a drive means 1 having an actuator such as a hydraulic motor or the like, a rotary motion part 2 rotated by activating the drive means 1, and a linear motion conversion part 3 converting the rotary motion of rotary motion part 2 into a linear motion.

Rotary motion part 2 comprises a first pair of power transmission elements 4 and 5, each being rotatable by a central drive shaft 8' attached to drive means 1. Linear motion conversion part 3 comprises a second pair of power transmission elements 6 and 7, each being slidably mounted on a helical spline 8. Power transmission elements 6 and 7 may be connected to the power transmission elements 4 and 5, respectively, via belt drive, gear drive, friction clutches or the like. helical spline 8 passes through and is slidabley connected to central parts of the power transmission elements 6 and 7, enabling each element 6 and 7 to move linearly with respect to the helical spline as each element is rotated along shaft 8.

Helix shaft 8 defines a pair of spaced-apart and oppositely oriented helix grooves 9 and 10 formed on the surface helix shaft. Helix grooves 9 and 10 are spirally formed on the surface of the helical spline so that each groove travels in a direction opposite to the other. The power transmission elements 6 and 7 each have radially inwardly extending projections 11 and 12 which extend and mate with helix grooves 9 and 10, respectively, when elements 6 and 7 are mounted on helical spline 8.

Power transmission elements 4 and 5 each comprise sets of teeth 13 and 14, respectively, arranged along one-half of a circumferential face of each element. The sets of teeth on elements 4 and 5 oppositely oriented on the drive shaft 8' so that at any given time a power transmission elements 4 or 5 is engaged with a power transmission element 6 or 7. In other words, the sets of teeth 13 and 14 are distributed on power transmission elements 4 and 5 and mounted to drive shaft 8 in such a manner that a toothed portion of one element corresponds to a non-toothed portion of the second element, and vice versa. Like the power transmission elements 6 and 7, the teeth 13 and 14 may be formed from various gears or the like.

Accordingly, the teeth 13 and 14 of the power transmission elements 4 and 5 sequentially engage the teeth of the power transmission elements 6 and 7. Therefore, power transmission elements 6 and 7 do not rotate at the same time, but rather rotate alternatively responsive to constant rotation of power transmission elements 4 and 5. The alternative rotation of the power transmission elements 6 and 7 causes the helical spline 8 to both rotate and to move along its axis in the forward and rearward directions, since the helix grooves 9 and 10 are spirals formed opposite to each other.

The helical spline 8 could rotate because it receives the turning effect of the power transmission elements 6 and 7 directly. However, since linear motion of the helical spline 8 is desired and not rotational motion, guide plates 15 and 16 are fixed to the surface of the helical spline along a portion of the length of the helical spline 8 to prevent the rotation of the helical spline 8 during the rotation of the power transmission elements 6 and 7. The guide plates 15 and 16 are aligned with and slidably reside within guide grooves 19 and 20 in guiders 17 and 18, respectively. The guiders 17 and 18 are used to receive and guide plates 15 and 16 as they move linearly with helical spline 8.

Upon the rotation of the drive shaft 8' the power transmission elements 4 and 5 are also rotated, causing the alternative engagement of the teeth 13 and 14 with the power transmission elements 6 and 7. As each power transmission elements 6 and 7 is alternatively engaged, it is set into rotational movement around the circumference of the helical spline 8. Since any corresponding rotation movement by the helix is prevented by the guiders 15 and 16, the movement of the helical spline is limited to forward and rearward linear axial movement. Stoppers 21 and 22 are positioned adjacent to an outside surface of each power transmission element 6 and 7, respectively to prevent the linear movement of the power transmission elements along helical spline and, thus isolating any linear movement to the helix shaft.

The stoppers 21 and 22 are united with the guiders 17 and 18, respectively, and a spacer S is positioned between the power transmission elements 6 and 7 adjacent to an inside surface of each to prevent linear movement of the power transmission elements and to ensure that power transmission element 6 (to the right of FIG. 1) does not insert into the groove 10 (to the left of FIG. 1) and that power transmission element 7 (to the left of FIG. 1) does not insert into the groove 9 (on the right of FIG. 1).

Alternatively, the rotation of the helical spline 8 can be prevented by forming a key groove in the helical spline 8, and a key in frames 23 and 24 supporting the helical spline 8 and positioning the key in the key groove, without using the guide plates 15 and 16 and the guiders 17 and 18.

Figures 2, 3:
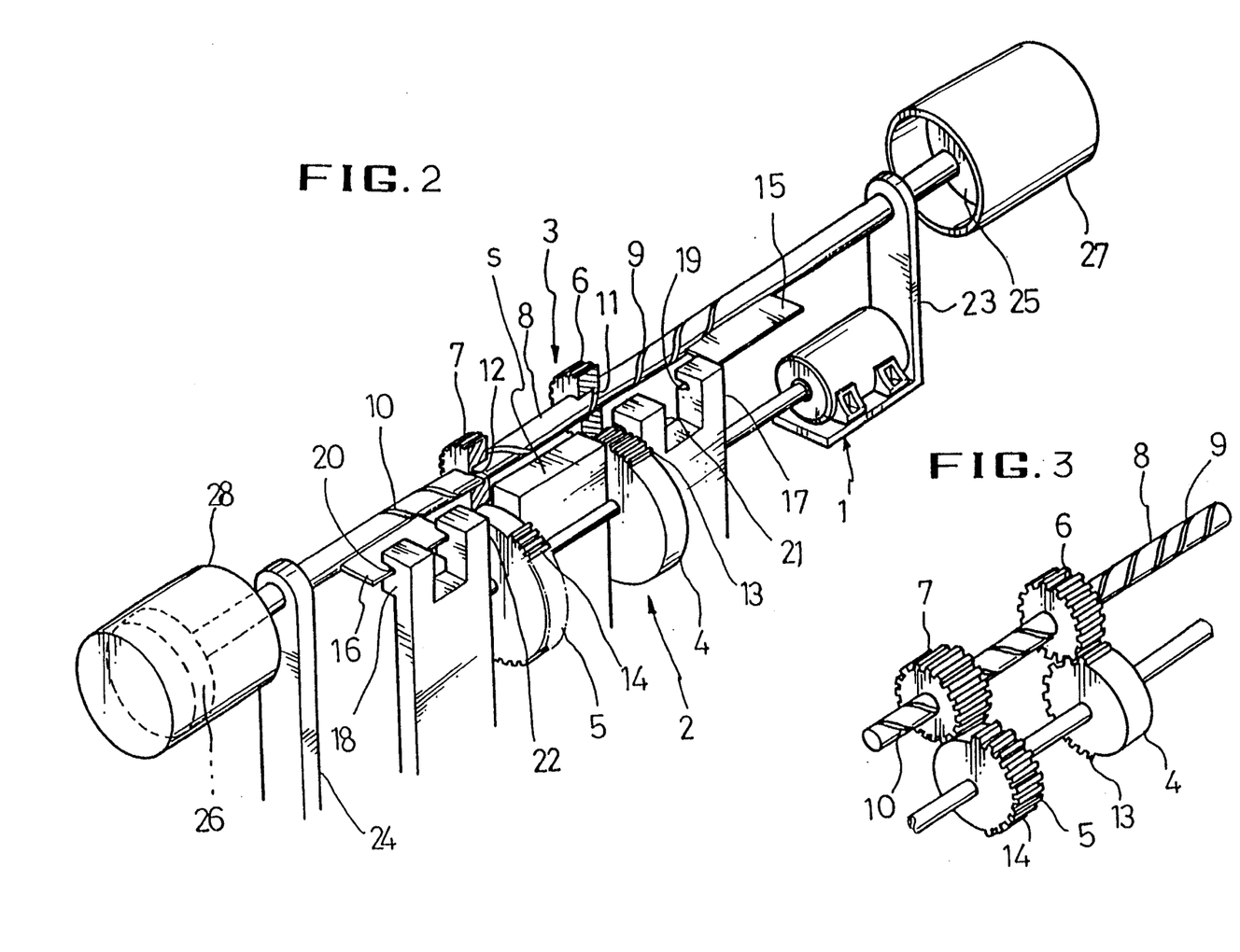
FIG. 2 is a semi-schematic perspective view of a preferred embodiment of a conversion device illustrating a hydraulic system constructed according to principles of this invention.
FIG. 3 is a perspective view of a preferred embodiment of a linear motion conversion part constructed according to principles of this invention used in the preferred embodiment illustrated in FIGS. 1 and 2.

FIG. 2 is a perspective view of the preferred embodiment of the motion conversion device shown in FIG. 1 comprising a hydraulic system constructed according to principles of this invention. Pistons 25 and 26 are attached at opposite ends of helical spline 8 so that pistons 25 and 26 are driven linearly corresponding with linear reciprocating movement of helical spline 8. The pistons 25 and 26 are movably disposed in cylinders 27 and 28, respectively that may be fixed to a frame.

FIG. 3 shows a detailed perspective view of the engagement of the power transmission elements 4 and 5 and transmission elements 6 and 7 shown in FIG. 1. Specifically illustrated is the staggered arrangement of the teeth 13 and 14 along the circumferential face of the power transmission elements 4 and 5, ensuring alternative engagement with either elements 6 or 7, respectively.

Figure 4:
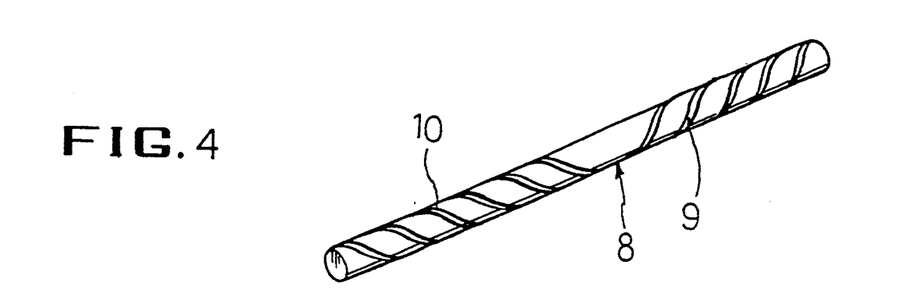
FIG. 4 is a perspective view illustrating a preferred embodiment of a helical spline constructed according to principles of this invention used in the preferred embodiment illustrated in FIGS. 1 and 2.

FIG. 4 shows a detailed perspective view of the helical spline 8 and the opposing directions of the spiral helix grooves 9 and 10.

Figure 5A:
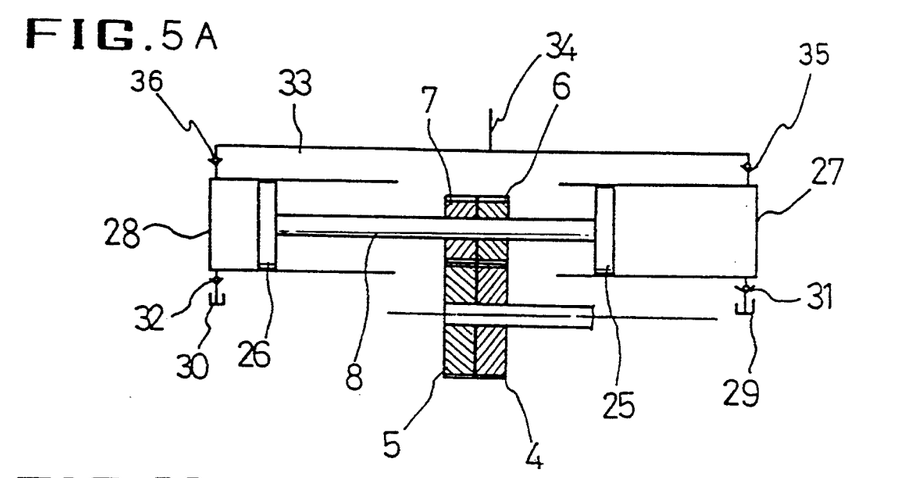
FIG. 5A is a schematic view illustrating a preferred embodiment of a hydraulic system constructed according to principles of this invention used in the preferred embodiment illustrated in FIGS. 1 and 2.

FIG. 5A is a schematic view of the embodiment of the motion conversion device shown in FIG. 2, illustrating a hydraulic pressure head producing operation. Cylinders 27 and 28 are each connected to reservoirs 29 and 30 via check valves 31 and 32 which each serves to facilitate the introduction of a selected fluid to be transported into the cylinder during an intake stroke, and prohibits the passage of fluid into reservoirs 29 and 30 during a compression or pressurizing stroke. Cylinders 27 and 28 are each connected to a common hydraulic line 33 that supplied the pressurized fluid through an output line 34.

Check valves 35 and 36 are attached in-line between the hydraulic line 33 and the cylinders 27 and 28, respectively, to prevent the backflow of pressurized fluid from the cylinders 27 and 28 into the cylinders during a fluid intake stroke.

The motion conversion device constructed according to principles of this invention is operated by the activation of the drive means 1, causing the rotation of the drive shaft 8'. The rotation of the drive shaft 8' causes the power transmission elements 4 and 5 to rotate. Since the teeth are formed in half the circumferential face of the power transmission elements 4 and 5, the turning effect of the power transmission elements 4 and 5 is alternatively transmitted to the power transmission elements 6 and 7.

The power transmission element 6 rotates in a direction opposite to the direction of the power transmission element 4 when the turning effect is first transmitted to the power transmission element 6, but the power transmission element 6 rotates at a predetermined position within the conversion device since the movement of the power transmission element 6 is constrained by the stopper 21 and the spacer S. The projection 11 of the power transmission element 6 moves helically within the helix groove 9 in the helical spline along a length of the shaft, causing the helical spline to move linearly within the device either in the forward or rearward direction depending on the direction of the helix groove and the direction that the power element 6 is rotated. For example, in FIG. 2 the helical spline 8 would move to the right or forward in the event that the power element 6 was rotated in a counter-clockwise direction by engagement with the power element 4.

After the power element 4 has rotated a sufficient distance that its teeth 13 no longer engage power element 6, the rotation of the power transmission element 6 is suspended and power transmission element 7 begins to rotate as the teeth of power transmission element 5 engage the power transmission element 7. As the power element 7 is rotated, the projection 13 of the power transmission element 7 moves helically within the helix groove 10 in the helical spline along a length of the shaft, causing the helical spline to move linearly within the device either in the forward or rearward direction depending on the direction of the helix groove and the direction that the power element 7 is rotated. For example, in FIG. 2 the helical spline would move to the left or rearward if the power element was rotated in a counter-clockwise direction by engagement with the power element 5.

The rotation of the helical spline is prevented when the power elements 6 or 7 engage the helical spline 8 because the guide plates 15 and 16 are fixed to the surface of the shaft and move linearly with the shaft within the groove portions formed in the guiders 17 and 18.

As described above, since the movement of the helical spline 8 to the right or left direction is successively repeated as far as the drive means 1 operates, the pistons 25 and 26 fixed at both ends of the helical spline 8 each move reciprocally in their respective cylinders 27 and 28. Oil or any other fluid that may be selected to be transported by the hydraulic system is stored in the reservoirs 29 and 30, fed to the cylinders 27 and 28, flows through the hydraulic line 33, and is supplied into a mechanism along the output line 34 as the oil in the cylinders 27 and 28 is pumped.

Figure 5B:
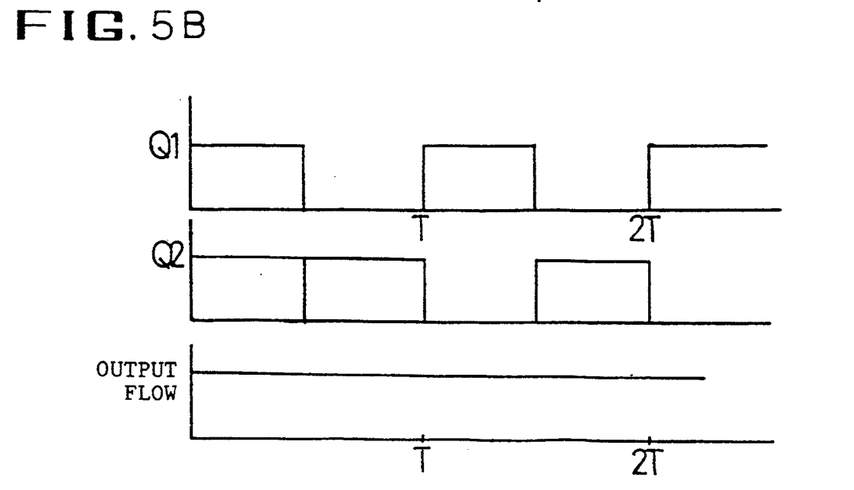
FIG. 5B is a diagram illustrating a timing sequence for the operation of the hydraulic system and the output flow pressure of the hydraulic device.

FIG. 5B illustrates a timing sequence for the operation of the hydraulic system and the output hydraulic flow pressure of the fluid leaving the output line 34. The timing of the oil pressurized from the cylinder 27 and the timing of the oil pumped from the cylinder 28 positioned in the left are alternately carried out so that the pressure of the oil flowing through the output line 34 is almost uniform, minimizing the occurrence of a pulsation.

The hydraulic flow characteristics of the fluid leaving the hydraulic system can be illustrated by flow equation Q1 during a first half cycle of the rotary motion part 2 as follows:

$$Q1 = \omega p \cdot \rho / 2 / \cdot A$$

where:

ωp is the rotation speed of a power transmission element 6 or 7;

ω is a pitch of the helical spline 8, and

A is an area of two pistons 25 and 26.

The flow equation Q1 in case of one reciprocating motion per one rotation of the rotary motion part 2 is as follows;

$$Q1 = Np/Nm = \rho/S$$

where:

Np is a tooth number of the power transmission element 6 or 7;

Nm is a tooth number of a power transmission element 4 or 5; and

S is a pump stroke of the piston 26 or 27, whereby the ωp becomes as follows;

$$\omega p = \omega m \cdot Nm/2 \cdot Np$$

accordingly, the flow equation Q1 becomes as follows:

$$Q1 = \omega m \cdot Nm/(2 \cdot Np) \cdot p/2\pi \cdot A.$$

Likewise, the flow equation Q2 during the first half cycle of the rotary motion part 2 is as follows:

$$Q2 = \omega m \cdot Nm/(2Np) \cdot p/2\pi \cdot A.$$

The entire flow amount Qt through the output line 34 becomes Q1+Q2, and the flow amount is as follows;

Accordingly, the output flow is uniform if the rotation speed of the drive means 1 is uniform since the rotation speed of the rotary motion part 2 is proportioned or the same as the rotation speed of the drive means 1.

The entire flow equation is Qt=Q1+Q2 when a piston pump of a first group moves reciprocally once in accordance with one rotation of the rotary motion part. Np/Nm=¼, a power transmission element 6 or 7 is the first group and split numbers are four when the piston pump of the first group moves twice reciprocally in accordance with one rotation of the rotary motion part 2.

In addition, a hydraulic system can be constructed according to principles of this invention such that a piston pump of a second group moves once reciprocally when the rotary motion part rotates once, and this the same as the case where the piston pump of the first group moves once reciprocally. When the piston pump of the second group moves one-half reciprocally in accordance with the one rotation of the rotary motion part 2, Np/Nm=½.

Figure 6:
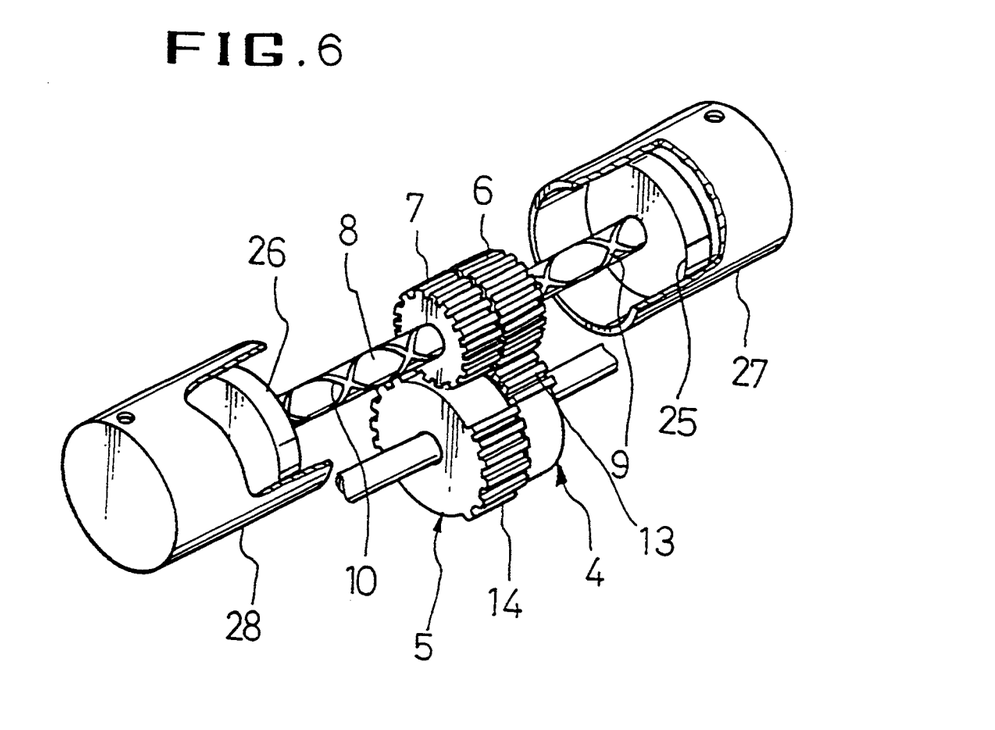
FIG. 6 is a perspective view illustrating a second embodiment of the hydraulic system constructed according to principles of this invention.

A plurality of piston pump groups can be disposed in the above-mentioned way. For example, FIG. 6 illustrates a hydraulic system constructed in a manner in which the piston pump of the first group moves twice reciprocally. In this case, the power transmission elements 4 and 5 each have two sets of teeth 13 and 14, respectively. The helical spline 8 comprises helix spiral grooves 9 and 10 formed opposite each other, each extending along the entire length of the helix shaft.

The embodiment of the hydraulic system shown in FIG. 6 has an advantage that the stroke of moving linearly forward of rearward (right or left of the figure) or vice versa can be maximized, and the device can be made compact since the spacer S is not used between the power transmission elements 6 and 7.

Figure 7:
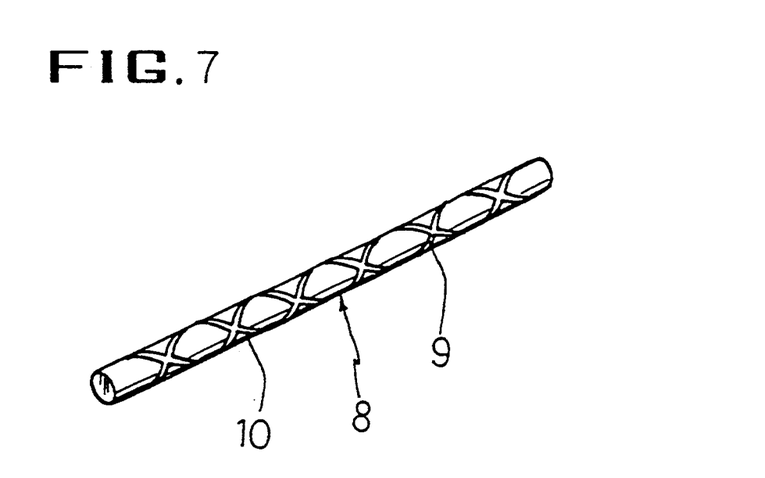
FIG. 7 is a perspective view illustrating a second embodiment of the helical spline constructed according to principles of this invention.

FIG. 7 is a perspective view of the helical spline use in FIG. 6 showing how the helix grooves 9 and 10 cross each other and extended across the length of the helical spline 8.

Figures 8, 9:
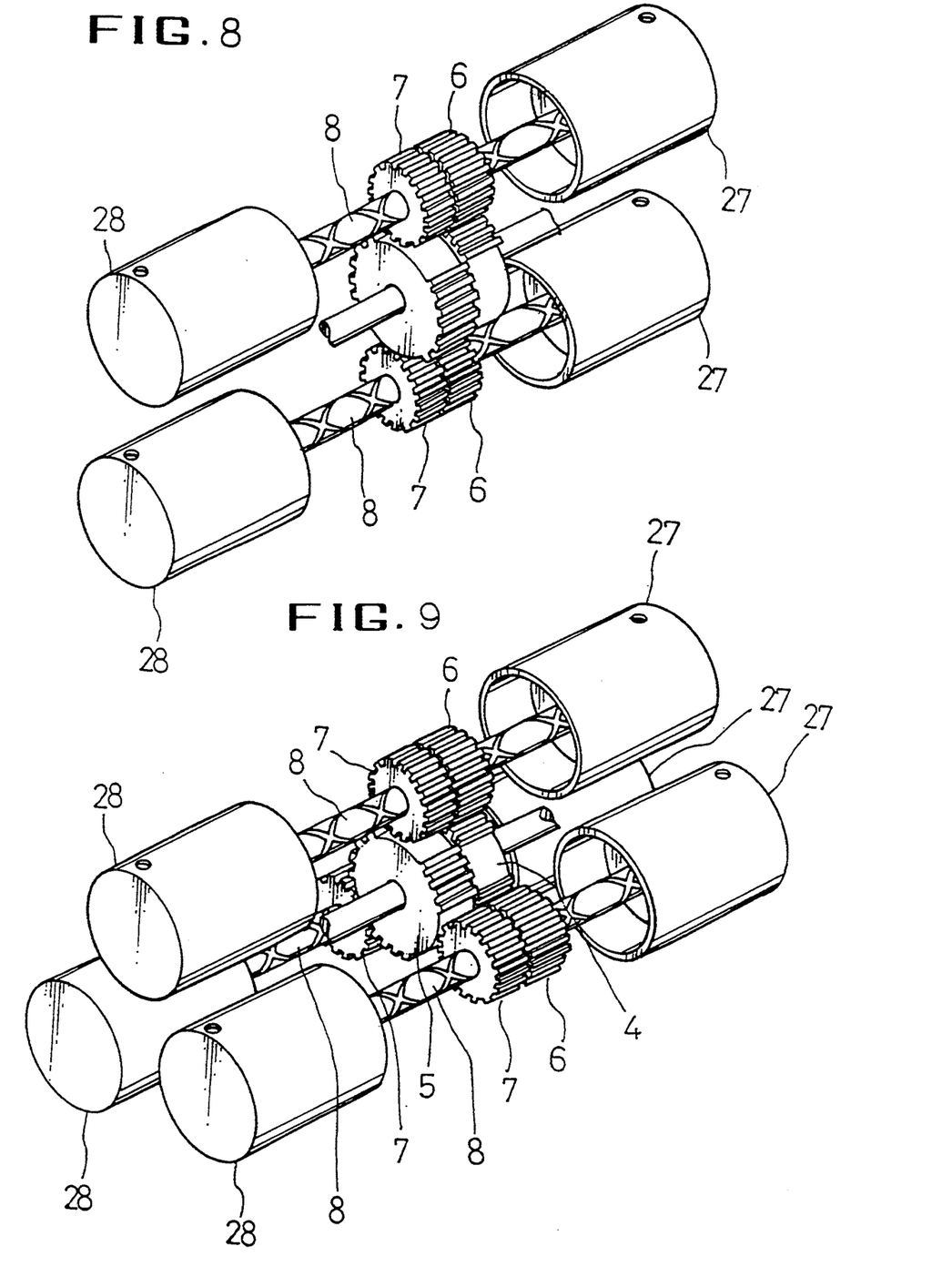
FIG. 8 is a perspective view illustrating a third embodiment of the hydraulic system constructed according to principles of this invention.
FIG. 9 is a perspective view illustrating a fourth embodiment of the hydraulic system constructed according to principles of this invention.

FIG. 8 is an illustration of an embodiment of the hydraulic system constructed according to principles of this invention in which the piston pump of the second group moves twice reciprocally per each rotation of the drive shaft 8'. The cylinder pairs 27 and 28 are disposed at each end the helix shafts 8 and the piston pairs 25 and 26, attached to each end of their respective helical spline 8, each move reciprocally in their respective cylinder pairs 27 and 28. The hydraulic system constructed in this manner is operated in the same way as the previously mentioned embodiments. However, the hydraulic pressure head is produced from a total four cylinders, so that the cycle is shorter than those of the above mentioned embodiments when represented in a timing diagram, thus minimizing the ripple of the hydraulic device.

FIG. 8 illustrates an embodiment of the hydraulic system having a piston pump of a third group. Three cylinder pairs 27 and 28 are disposed at the end of each helical spline 8 and the piston pairs 25 and 26 are each attached to a respective end of their respective helix shafts 8, so that the pumping operation of each group can be carried out separately.

The hydraulic system constructed as described above has the advantage that the ripple of the hydraulic system can be reduced much more since at least six pumping operations or more are possible when the rotary motion part 2 rotates once.

As described the above, the hydraulic system has the advantage that the ripple of the hydraulic can be minimized because time difference between an initial point and a terminal point seldom occurs. This is true because the power transmission elements 4 and 5, having the teeth formed along a portion of the circumferential face of each, are positioned on the drive shaft 8' of the drive means 1, the power transmission elements 6 and 7 are engaged into the power elements 4 and 5, the turning effect is made to transmit only to the teeth portion, a plurality of power elements 6 and 7 receive the turning effect sequentially, the power elements 6 and 7 are inserted into the helix grooves 9 and 10, respectively, formed in the helical spline 8, the rotational motion of the power elements 6 and 7 receiving the power is transmitted to the helical spline which converts the rotational motion to linear motion, causing the pumping operation to be carried out by the hydraulic device.

The hydraulic system constructed according to principles of this invention has the advantage that the device can be connected directly to an automatic line without the need for using an additional unit such as an accumulator or the like since ripple of the hydraulic pressure head seldom occurs.

The hydraulic system having a construction of a hydraulic pump type is described in the above-mentioned embodiment. However, it is to be understood that the conversion device can also be applied to a hydraulic motor which can use the rotational effect to activate the motor by using the linear motion of the piston.

It will be apparent to those skilled in the art that various modifications and variations can be made in the conversion device and the hydraulic system of the present invention without departing from the spirit or scope of the invention. Thus, it is intended that the present invention cover the modifications and variations of this invention provided they come within the scope of the appended claims and their equivalents.

What is claimed is:

1. A rotary motion/constant velocity linear reciprocating motion conversion device comprising:
   a rotary motion part having a first pair of power transmission elements each rotating at the same speed, the power transmission elements each having teeth alternatively positioned along a circumferential surface capable of transmitting power to an adjacent element;

a second pair of power transmission elements each being rotated alternatively by engagement with the teeth of an adjacent one of the first power transmission elements; and a helical spline shaft comprising oppositely configured helix grooves formed along a surface of the shaft and extending across a length of the shaft, the helix grooves being engaged by a portion of the second power transmission elements.

2. A motion conversion device as recited in claim 1 wherein a linear motion of the helical spline is converted into a rotary motion, and the rotary motion of the power transmission elements is converted into the linear motion.

3. A hydraulic system using a rotary motion/constant velocity linear reciprocating motion conversion device comprising:

a helical spline shaft capable of linear motion, the helical spline comprising helix grooves extending along a surface portion of the shaft in opposite directions, pistons attached at opposing ends of the shaft, the pistons residing in cylinders attached to the device, the pistons residing in the cylinders being capable of pumping oil from hydraulic tanks located at both ends;

a first pair of power transmission elements, each element comprising teeth arranged along a portion of a circumferential surface of the element, the first pair of power transmission elements being mounted to a central drive shaft in such a manner that the portion of the circumferential surface of one of said element comprising teeth corresponds to a portion of the circumferential surface of the other of said element that does not comprise teeth, the drive shaft being rotated by a driving means; and a second pair of power transmission elements each comprising projections positioned to engage the helix grooves in the helix shaft, the second pair of transmission elements being slidably mounted to the helical spline so that the projections engage a respective helix groove, the second pair of power transmission elements being positioned adjacent to the first pair of power transmission elements so that the toothed portion of one of the first transmission elements engages and rotates an adjacent one of said second transmission elements.

4. A hydraulic system as recited in claim 3 wherein the interaction of the projections of the second transmission elements in the helix grooves causes the helical spline to move in a linear manner, causing the pistons to move in a reciprocating manner within said respective cylinder.

* * * * *

UNITED STATES PATENT AND TRADEMARK OFFICE
CERTIFICATE OF CORRECTION

PATENT NO. : 5,390,585
DATED : February 21, 1995
INVENTOR(S) : Young-sun Ryuh

It is certified that error appears in the above-indentified patent and that said Letters Patent is hereby corrected as shown below:

```
Column 1, line 57, change "above mentioned" to
          -- above-mentioned --.
Column 1, line 58, before "comprises" delete "may".
Column 2, line 59, after "existing" insert -- in --.
Column 3, line 56, change "helical" to -- Helical --.
Column 3, line 57, change "slidabley" to -- slidably --.
Column 4, line 7, before "power" delete "a".
Column 4, line 8, before "engaged" change "is"
          to -- are --.
Column 6, line 51, change "Q1 = ωp·p/2/·A"
          to -- Q1 = ωp·p/2·A --.
Column 7, line 39, after "and this" insert -- is --.
Column 7, line 56, after "forward" change "of"
          to -- or --.
Column 7, line 60, after "spline" change "use"
          to -- used --.
Column 7, line 62, change "extended" to -- extend --.
Column 8, line 7, after "total" insert -- of --.
Column 8, line 25, after "described" delete "the".
```

Signed and Sealed this

Second Day of January, 1996

*Attest:*

BRUCE LEHMAN

*Attesting Officer*    *Commissioner of Patents and Trademarks*